(12) United States Patent
Chen

(10) Patent No.: US 12,081,876 B2
(45) Date of Patent: Sep. 3, 2024

(54) METHOD FOR DETERMINING PHOTOGRAPHING MODE, ELECTRONIC DEVICE AND STORAGE MEDIUM

(71) Applicant: BEIJING BYTEDANCE NETWORK TECHNOLOGY CO., LTD., Beijing (CN)

(72) Inventor: Guanghui Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/336,981

(22) Filed: Jun. 17, 2023

(65) Prior Publication Data

US 2023/0336878 A1 Oct. 19, 2023

Related U.S. Application Data

(63) Continuation of application No. PCT/CN2021/138737, filed on Dec. 16, 2021.

(30) Foreign Application Priority Data

Dec. 17, 2020 (CN) .......................... 202011502690.2

(51) Int. Cl.
*H04N 23/741* (2023.01)
*G06T 7/00* (2017.01)
(Continued)

(52) U.S. Cl.
CPC ............. *H04N 23/741* (2023.01); *G06T 7/97* (2017.01); *H04N 23/64* (2023.01);
(Continued)

(58) Field of Classification Search
CPC .... H04N 23/741; H04N 23/64; H04N 23/951; G06T 7/97; G06T 2207/20081; G06T 2207/20208; G06T 2207/20228
See application file for complete search history.

(56) References Cited

U.S. PATENT DOCUMENTS 10,498,963 B1 * 12/2019 Sorgi ...................... G06T 7/13
2009/0096896 A1    4/2009 Imafuji et al.
(Continued)

FOREIGN PATENT DOCUMENTS

CN    101399925 A    4/2009
CN    102946513 A    2/2013
(Continued)

OTHER PUBLICATIONS

International Search Report and Written Opinion; International Patent Application No. PCT/CN2021/138737, Mar. 9, 2022, with English translation of Search Report (11 pages).
(Continued)

*Primary Examiner* — Hung H Lam
(74) *Attorney, Agent, or Firm* — HSML P. C.

(57) ABSTRACT

A photographing mode determination method and apparatus, and an electronic device and a storage medium are provided. The method comprises: acquiring at least two consecutive frames of images photographed by an image photographing apparatus; determining whether there are two frames of images having a similarity less than a preset threshold value in the at least two consecutive frames of images; and if two frames of images having a similarity less than the preset threshold value are not present in the at least two consecutive frames of images, setting a photographing mode of the image photographing apparatus to be a high-dynamic range mode.

20 Claims, 3 Drawing Sheets

(51) Int. Cl.
    *H04N 23/60*        (2023.01)
    *H04N 23/951*       (2023.01)
(52) U.S. Cl.
    CPC . *H04N 23/951* (2023.01); *G06T 2207/20081* (2013.01); *G06T 2207/20208* (2013.01); *G06T 2207/20228* (2013.01)

(56) References Cited

U.S. PATENT DOCUMENTS

| | | | |
|---|---|---|---|
| 2009/0102945 A1 | 4/2009 | Chen | |
| 2015/0262341 A1 | 9/2015 | Nash et al. | |
| 2017/0289539 A1* | 10/2017 | Le Callet | G06V 20/40 |
| 2018/0084181 A1 | 3/2018 | Sachs et al. | |
| 2019/0114795 A1* | 4/2019 | Rajvanshi | G06T 7/97 |
| 2020/0244862 A1 | 7/2020 | Wang et al. | |
| 2020/0244865 A1 | 7/2020 | Chen | |
| 2022/0398698 A1* | 12/2022 | Li | G06T 5/002 |
| 2023/0038844 A1* | 2/2023 | Li | G06T 5/50 |

FOREIGN PATENT DOCUMENTS

| | | |
|---|---|---|
| CN | 107888839 A | 4/2018 |
| CN | 109040603 A | 12/2018 |
| CN | 109618102 A | 4/2019 |
| CN | 110445988 A | 11/2019 |
| CN | 110475072 A | 11/2019 |
| CN | 111479072 A | 7/2020 |
| CN | 111835982 A | 10/2020 |
| JP | 2009081693 A | 4/2009 |
| JP | 2012090041 A | 5/2012 |
| JP | 2012239076 A | 12/2012 |
| JP | 2014146850 A | 8/2014 |

OTHER PUBLICATIONS

The extended European search report issued in European Application No. 21905779.1, dated Apr. 4, 2024.

Office Action issued in Japanese Application No. 2023-536906, dated Jul. 23, 2024, with machine translation.

* cited by examiner

METHOD FOR DETERMINING PHOTOGRAPHING MODE, ELECTRONIC DEVICE AND STORAGE MEDIUM

This application is a continuation of International application No. PCT/CN2021/138737 filed on Dec. 16, 2021, which claims the priority to Chinese patent application No. 202011502690.2, titled "METHOD AND APPARATUS FOR DETERMINING PHOTOGRAPHING MODE, ELECTRONIC DEVICE AND STORAGE MEDIUM", filed on Dec. 17, 2020 with the China National Intellectual Property Administration, both of which are incorporated herein by reference in their entireties.

FIELD

The present disclosure relates to the technical field of image processing, and in particular to a method and an apparatus for determining a photographing mode, an electronic device and a storage medium.

BACKGROUND

A high-dynamic range (HDR) image may provide more dynamic range and image details because it records more environmental lighting information.

At present, a user usually manually enables a high-dynamic range mode of an image photographing apparatus based on photographing environment when taking pictures, which not only increases the number of times the user manually operates the image photographing apparatus, but also hampers the realization of intelligent photographing effect due to the lack of effective automatic trigger mechanism to enable the high-dynamic range mode.

SUMMARY

In order to solve the above technical problems or at least partially solve the above technical problems, a method and an apparatus for determining a photographing mode, an electronic device and a storage medium are provided according to embodiments of the present disclosure.

In a first aspect, a method for determining a photographing mode is provided according to an embodiment of the present disclosure. The method includes:
  acquiring at least two consecutive image frames captured by an image photographing apparatus;
  determining whether the at least two consecutive image frames include two image frames having a similarity less than a preset threshold; and
  setting the photographing mode of the image photographing apparatus to a high-dynamic range mode if the at least two consecutive image frames do not include two image frames having the similarity less than the preset threshold.

In a case that the image photographing apparatus is in the high-dynamic range mode, an image captured and output by the image photographing apparatus is a high-dynamic range image.

In a second aspect, an apparatus for determining a photographing mode is further provided according to an embodiment of the present disclosure. The apparatus includes an image acquisition module, a similarity determination module and a mode setting module.

The image acquisition module is configured to acquire at least two consecutive image frames captured by an image photographing apparatus.

The similarity determination module is configured to determine whether the at least two consecutive image frames include two image frames having a similarity less than a preset threshold.

The mode setting module is configured to set the photographing mode of the image photographing apparatus to a high-dynamic range mode if the at least two consecutive image frames do not include two image frames having the similarity less than the preset threshold.

In a case that the image photographing apparatus is in the high-dynamic range mode, an image captured and output by the image photographing apparatus is a high-dynamic range image.

In a third aspect, an electronic device is further provided according to an embodiment of the present disclosure. The electronic device includes: a processor; a memory configured to store processor-executable instructions, and a camera configured to capture images; where the processor is configured to read the executable instructions from the memory and execute the executable instructions to implement the method for determining the photographing mode according to any one of the embodiments of the present disclosure.

In a fourth aspect, a computer readable storage medium storing a computer program is further provided according to an embodiment of the present disclosure. The computer program, when executed by a processor, causes the processor to implement the method for determining the photographing mode according to any one of the embodiments of the present disclosure.

Compared with the conventional art, the technical solutions according to the embodiments of the present disclosure have the following advantages. According to the embodiments of the present disclosure, a photographing mode of an image photographing apparatus is set to a high-dynamic range mode to capture a high-dynamic range image in response to determining that at least two consecutive image frames captured by the image photographing apparatus do not include two image frames having a similarity less than a preset threshold. Thus, an effective detection mechanism is provided to reasonably determine whether to enable the high-dynamic range mode for the image photographing apparatus, which optimizes a detection result, solves the problem that the photographing mode is required to be manually triggered by a user without intelligence in the existing photographing process, and ensures the accuracy of determining the timing of enabling the high-dynamic range mode. At the same time, before enabling the high-dynamic range mode, image similarity detection is performed, which avoids a phenomenon of "ghost image" in subsequent images captured by the user and ensures the quality of image photographing.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly explain the embodiments of the present disclosure or the technical solutions in the conventional art, the drawings used in the description of the embodiments or the conventional art are briefly introduced below. Apparently, for those skilled in the art, other drawings can be obtained according to the provided drawings without any creative effort.

DETAILED DESCRIPTION OF EMBODIMENTS

In order to understand the above objects, features and advantages of the present disclosure more clearly, the solutions of the present disclosure are further described hereinafter. It should be noted that the embodiments of the present disclosure and the features in the embodiments can be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

Figure 1:
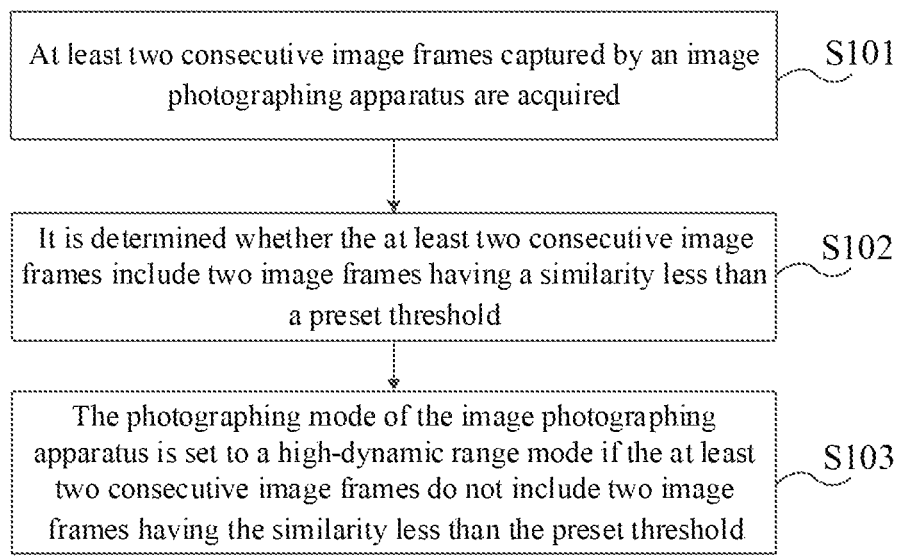
FIG. 1 is a flowchart of a method for determining a photographing mode according to an embodiment of the present disclosure.

FIG. 1 is a flowchart of a method for determining a photographing mode according to an embodiment of the present disclosure. The method may be applied to a case of determining for an image photographing apparatus whether to enable a high-dynamic range mode for image photographing. The method according to the embodiment of the present disclosure may be executed by an apparatus for determining a photographing mode. The apparatus for determining a photographing mode may be implemented by software and/or hardware, and may be integrated on any electronic device with computing power such as a mobile terminal or a tablet computer integrated with an image photographing apparatus, or an image photographing apparatus dedicated for photographing such as a camera device.

In order to ensure the accuracy of detecting a photographing mode of an image photographing apparatus, in the method according to the embodiment of the present disclosure, detection may be continuously and repeatedly performed at a faster execution cycle in a preview mode of the image photographing apparatus. The execution cycle is usually in seconds. The preview mode may refer to a mode in which a current photographing environment is captured or photographed in real time (for example, content displayed in a camera viewfinder) after the image photographing apparatus is enabled and before a user triggers a photographing instruction, so that the user may preview effect of the image.

Moreover, the method according to the embodiment of the present disclosure may be applied to a photographing scene where a moving speed of a photographing object is greater than a speed threshold determined based on the photographing scene, such as the photographing scene where the object is a moving train, which is beneficial to improve the photographing quality for a dynamic object.

As shown in FIG. 1, a method for determining a photographing mode according to an embodiment of the present disclosure may include the following steps S101 to S103.

In S101, at least two consecutive image frames captured by an image photographing apparatus are acquired.

For example, an image stream (i.e., preview stream) is generated in real time in a preview mode of an image photographing apparatus, and at least two consecutive image frames captured by the image photographing apparatus, such as at least two consecutive image frames ending at a current image, may be acquired from the image stream. Then, it is determined whether the image photographing apparatus is set to a high-dynamic range mode in a current photographing environment through image similarity calculation, so as to output a high-dynamic range image in the high-dynamic range mode. The number of acquired consecutive image frames is not specifically limited in the embodiment of the present disclosure, and may be rationally set based on requirements.

In S102, it is determined whether the at least two consecutive image frames include two image frames having a similarity less than a preset threshold.

In an embodiment, for the at least two consecutive image frames acquired, similarities between every two of the images may be calculated, to determine whether the at least two consecutive image frames include two image frames having a similarity less than a preset threshold. Alternatively, a preset number of image frames may be selected from the at least two consecutive image frames based on a preset image selecting strategy, and similarities between every two of the images may be calculated for the selected images, to determine whether two image frames having a similarity less than a preset threshold exist in the preset number of selected image frames. The preset number of frames may be at least two frames. The image selecting strategy may include selecting the preset number of image frames from the at least two acquired consecutive image frames at a preset frame number interval, or may include taking at least two designated image frames in the at least two acquired consecutive image frames as the selected images. The preset frame number interval and the designated frame may be set adaptively under the premise of ensuring the accuracy of detecting the photographing mode of the image photographing apparatus, which is not limited in the embodiment of the present disclosure.

The preset threshold of similarity may also be set adaptively. The similarity may be calculated by any available image similarity calculation method in the conventional art, such as Euclidean distance calculation and cosine similarity calculation, which is not limited in the embodiment of the present disclosure.

By calculating similarities between every two of the images for the at least two consecutive image frames acquired, the accuracy for determining two image frames having a similarity less than the preset threshold can be ensured. By calculating similarities between every two of the images for the preset number of selected image frames, the efficiency of similarity calculation is improved. Moreover, in the preview mode of the image photographing apparatus, the acquired images are continuous and in real-time, which may reflect a state change of a current photographing object continuously and in real time. Therefore, even the determination of whether the at least two consecutive image frames include two image frames having a similarity less than a preset threshold is performed based on selected image frames, the determination can still be relatively accurate.

For example, in a case that a current photographing object is a moving train, in the preview mode of the image photographing apparatus, an image stream about a movement of the train may be acquired in real time. In an execution cycle according to the embodiment of the present disclosure, usually in a few seconds, assuming that the at least two consecutive image frames acquired include four image frames, due to continuous changes in train position, a difference between the first image frame and the fourth image frame is at maximum. If a similarity between the first image frame and the fourth image frame is greater than the preset threshold, a similarity between any two image frames in the at least two consecutive image frames is greater than the preset threshold, i.e., the at least two acquired consecutive image frames do not include two image frames having a similarity less than the preset threshold. Therefore, by calculating the similarity between two specific image frames, not only the calculation efficiency is improved, but also the determination accuracy is ensured. If the similarity between the first image frame and the fourth image frame is less than the preset threshold, no matter whether two image frames having a similarity less than the preset threshold exist in the remaining image frames, a determination result is already obtained, i.e., two image frames having a similarity less than the preset threshold exist in the at least two acquired consecutive image frames. In this case, the image photographing apparatus is not set to a high-dynamic range mode.

Further, in a process of calculating a similarity between two image frames, the method may further include the following operations.

Region segmentation is performed on each image frame participating in similarity calculation to obtain an image block belonging to each image frame. A size of the image block may be set adaptively, which is not limited in the embodiment of the present disclosure. Small image block results in high accuracy of subsequent similarity calculation but low calculation efficiency. A sub-similarity between image blocks belonging to different images in two image frames is calculated; and a similarity between the two image frames is determined based on the sub-similarity between the image blocks. For example, the determining similarity between the two image frames based on the sub-similarity between the image blocks may be implemented by: for any image frame in the two image frames, determining a proportion of image blocks having a sub-similarity less than a sub-similarity threshold in the image frame, where the sub-similarity threshold may be determined based on similarity calculation requirements; and determining the similarity between the two image frames based on the proportion. If the proportion of image blocks having the sub-similarity less than the sub-similarity threshold in the image is greater than a proportion threshold, which may be set flexibly, to be for example 80%, it is determined that the similarity between the two image frames is less than the preset threshold. Otherwise, it may be determined that the similarity between the two image frames is greater than or equal to the preset threshold. In addition, a comprehensive similarity value may be obtained by weighted sum or other operations of sub-similarities between the image blocks, to be taken as the similarity between the two image frames.

It is beneficial to improve the calculation accuracy of similarity between images by calculating the similarity between the image blocks, and a position of the photographing object on two image frames may be determined through image blocks having a small similarity.

In S103, the photographing mode of the image photographing apparatus is set to a high-dynamic range mode if the at least two consecutive image frames do not include two image frames having the similarity less than the preset threshold.

In a case that the image photographing apparatus is in the high-dynamic range mode, images captured and output by the image photographing apparatus are high-dynamic range images.

If it is determined that the at least two consecutive image frames do not include two image frames having the similarity less than the preset threshold, it is regarded that the at least two consecutive image frames are highly similar. Thus, in process of photographing images by using the high-dynamic range mode of the image photographing apparatus, there is no "ghost image" on the high-dynamic range image obtained by image synthesis. Therefore, it is feasible to set the image photographing apparatus into the high-dynamic range mode. If it is determined that two image frames having the similarity less than the preset threshold exist in the at least two consecutive image frames, it is regarded that there is a certain difference between the at least two consecutive image frames. Thus, in the process of photographing images by using the high-dynamic range mode of the image photographing apparatus, there may be "ghost image" on the high-dynamic range image obtained by image synthesis. Therefore, it is not suitable to set the image photographing apparatus into the high-dynamic range mode. The "ghost image" refers to a phenomenon that there is disruptive shadow on the synthesized image in a case that there is a big difference between two image frames participating in the synthesis, which affects the quality of the synthesized image.

According to the embodiments of the present disclosure, a photographing mode of an image photographing apparatus is set to a high-dynamic range mode to capture a high-dynamic range image in response to determining that at least two consecutive image frames captured by the image photographing apparatus do not include two image frames having a similarity less than a preset threshold. Thus, an effective detection mechanism is provided to reasonably determine whether to enable the high-dynamic range mode for the image photographing apparatus, which optimizes a detection result, solves the problem that the photographing mode is required to be manually triggered by a user without intelligence in the existing photographing, and ensures the accuracy of determining the timing of enabling the high-dynamic range mode. At the same time, before enabling the high-dynamic range mode, image similarity is detected, which avoids a phenomenon of "ghost image" in subsequent images captured by the user and ensures the quality of image photographing.

Optionally, before setting the photographing mode of the image photographing apparatus to the high-dynamic range mode, the method further includes:

determining whether the at least two consecutive image frames include an image whose brightness information fulfilling target brightness information; where the target brightness information is used to define an image brightness condition for triggering the high-dynamic range mode.

Accordingly, setting the photographing mode of the image photographing apparatus to the high-dynamic range mode if the at least two consecutive image frames do not include two image frames having the similarity less than the preset threshold may include:

setting the photographing mode of the image photographing apparatus to the high-dynamic range mode if the at least two consecutive image frames include the image whose brightness information fulfilling the target brightness information and the at least two consecutive image frames do not include two image frames having the similarity less than the preset threshold. By determining whether to enable the high-dynamic range mode of the image photographing apparatus based on both the image similarity and the image brightness information, the accuracy and rationality of the timing of enabling can be further ensured.

In an embodiment, the determining whether the at least two consecutive image frames include an image whose brightness information fulfilling target brightness information may include: determining an image histogram of each image frame in the at least two consecutive image frames; determining brightness information of each image frame based on each image histogram; and determining whether the at least two consecutive image frames include the image whose brightness information fulfilling the target brightness information based on the determined image brightness information. Alternatively, the determining whether the at least two consecutive image frames include an image whose brightness information fulfilling target brightness information may include: selecting the preset number of image frames from the at least two consecutive image frames based on an image selecting strategy, where the current preset number of frames may be at least one frame; determining an image histogram of each of the selected images; determining brightness information of corresponding images based on the image histogram of the selected images; and determining whether the selected images include the image whose brightness information fulfilling the target brightness information based on the determined image brightness information. The image selecting strategy may include selecting the preset number of image frames from the at least two acquired consecutive image frames at a preset frame number interval, or may include taking an image corresponding to at least one designated frame in the at least two acquired consecutive image frames as the selected image.

It should be noted that the image selecting strategy adopted in the process of determining the image brightness information may be the same as that adopted in the process of calculating the similarity between images, that is, images participating in the two operation processes may be the same. For example, two image frames that are separated by the target number of frames are determined from the at least two consecutive image frames, and then it is determined whether the two image frames that are separated by the target number of frames include an image whose brightness information fulfilling target brightness information.

Optionally, the determining whether the at least two consecutive image frames include an image whose brightness information fulfilling target brightness information may include:

determining, for each image frame in the at least two consecutive image frames, or for each image frame in the images selected based on the image selecting strategy, a first image region with image brightness less than a first brightness threshold and a second image region with image brightness greater than a second brightness threshold. The first brightness threshold is smaller than the second brightness threshold, a specific value of which may be adaptively determined.

It is determined whether a ratio of the first image region to the second image region is within a region threshold interval. The region threshold interval may be determined based on a distribution of image brightness regions in a case that the high-dynamic range mode of the image photographing apparatus is enabled.

If an image in which a ratio of the first image region to the second image region is within the region threshold interval exists in the at least two consecutive image frames, or if an image in which a ratio of the first image region to the second image region is within the region threshold interval exists in the images selected based on the above image selecting strategy, it means that an image whose brightness information fulfilling the target brightness information exists in the at least two consecutive image frames, i.e., an image representing uneven brightness distribution exists. Otherwise, the image representing uneven brightness distribution does not exist.

Optionally, the determining whether the at least two consecutive image frames include an image whose brightness information fulfilling target brightness information may include:

determining whether the at least two consecutive image frames include an image whose brightness value is greater than a third brightness threshold or whose brightness value is less than a fourth brightness threshold; or determining whether the images selected based on the above image selecting strategy include an image whose brightness value is greater than a third brightness threshold or whose brightness value is less than a fourth brightness threshold. The fourth brightness threshold is smaller than the third brightness threshold, the specific value of which may be adaptively determined for selecting an image representing uneven brightness distribution.

If the at least two consecutive image frames include an image whose brightness value is greater than the third brightness threshold or whose brightness value is less than the fourth brightness threshold, or if the images selected based on the above image selecting strategy include an image whose brightness value is greater than the third brightness threshold or whose brightness value is less than the fourth brightness threshold, it means that an image whose brightness information fulfilling the target brightness information exists in the at least two consecutive image frames, i.e., an image representing uneven brightness distribution exists. Otherwise, an image representing uneven brightness distribution does not exist.

The principle of using the image brightness information as a basis for determining for the image photographing apparatus whether to enable the high-dynamic range mode may find reference in conventional implementation principle of determining whether to enable the high-dynamic range mode of the image photographing apparatus based on the image brightness. The above examples should not be understood as limitation to the embodiment of the present disclosure.

In addition, the order for executing the operation of determining whether the at least two consecutive image frames include an image whose brightness information fulfilling the target brightness information and the operation of determining whether the at least two consecutive image frames include two image frames having the similarity less than the preset threshold is not limited. That is, image brightness information detection may be performed before or after image similarity detection. As a preferred solution, the image brightness information detection may be performed after the image similarity detection, thereby improving the detection efficiency of whether to enable the high-dynamic range mode on the basis of ensuring the accuracy of determining the timing of enabling the high-dynamic range mode.

Moreover, in a case of selecting images from the at least two consecutive image frames based on the image selecting strategy, if the image brightness information detection is performed after the image similarity detection, at least one image frame may be further selected from the images participating in the image similarity calculation, and then it is determined whether the further selected at least one image frame includes an image whose brightness information fulfilling the target brightness information. For example, any image frame of the two image frames participating in similarity calculation is used as objects of image brightness information detection, that is, it is determined whether brightness information of the image frame fulfils the target brightness information. If it is determined that the brightness information of the image frame fulfils the target brightness information, it is regarded that the at least two consecutive image frames include the image whose brightness information fulfilling the target brightness information. Thus, the efficiency of detecting whether to enable the high-dynamic range mode is further improved.

Figure 2:
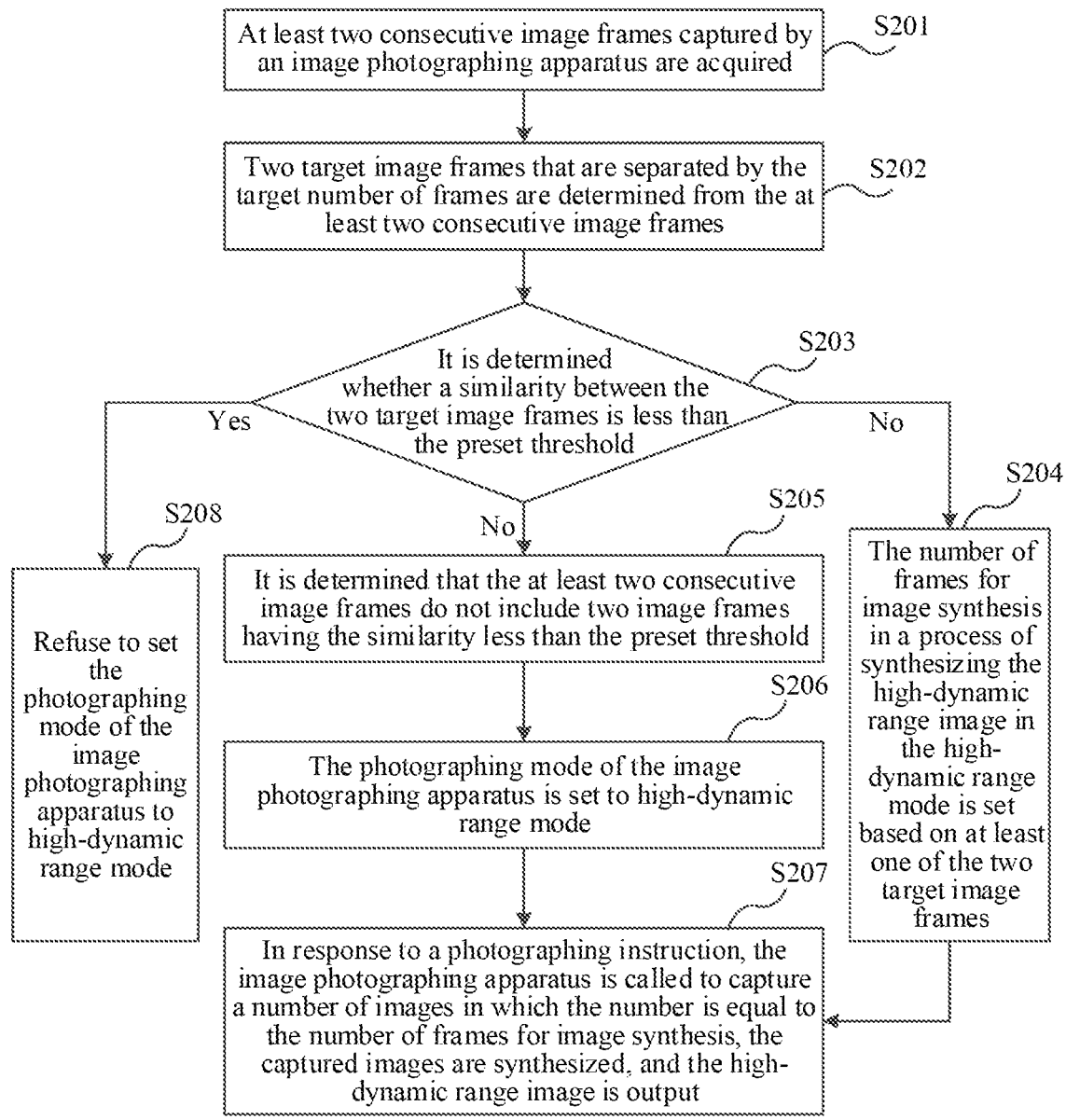
FIG. 2 is a flowchart of a method for determining a photographing mode according to another embodiment of the present disclosure.

FIG. 2 is a flowchart of a method for determining a photographing mode according to another embodiment of the present disclosure. This method is further optimized and expanded based on the above technical solution and may be combined with the above embodiments. As shown in FIG. 2, the method may include the following steps S201 to S208.

In S201, at least two consecutive image frames captured by an image photographing apparatus are acquired.

In S202, two target image frames that are separated by the target number of frames are determined from the at least two consecutive image frames.

The value of the target number of frames may be set adaptively, such as three or four frames. The target number of frames being three frames is taken as an example, the at least two consecutive image frames include five image frames, and images participating in similarity calculation may be the first image frame and the fifth image frame, to improve the calculation efficiency. Moreover, the images acquired are continuous and in real-time, which may reflect a state change of a current photographing object continuously and in real time. Therefore, even the determination of whether the at least two consecutive image frames include two image frames having a similarity less than a preset threshold is performed based on two target image frames that are separated by the target number of frames, the determination can still be relatively accurate.

In S203, it is determined whether a similarity between the two target image frames is less than the preset threshold.

If it is determined that the similarity between the two target image frames is not less than the preset threshold, i.e., the similarity between the two target image frames is greater than or equal to the preset threshold, operations S204 and S205 are executed. Otherwise, an operation S208 is executed.

In S204, the number of frames for image synthesis in a process of synthesizing the high-dynamic range image in the high-dynamic range mode is set based on at least one of the two target image frames.

In the high-dynamic range mode of the image photographing apparatus, the finally captured high-dynamic range image is obtained by synthesizing multiple image frames automatically captured by the image photographing apparatus. If the number of frames for image synthesis that is required to be captured by the image photographing apparatus is reasonably determined before performing image capturing by using the high-dynamic range mode of the image photographing apparatus, the photographing rationality of the high-dynamic range image can be improved and the photographing quality can be guaranteed.

In an embodiment, an upper limit value and a lower limit value for an exposure value (EV) (i.e., a range of exposure value) of the image photographing apparatus in the high-dynamic range mode may be determined based on brightness information of the at least two consecutive image frames or brightness information of at least one of two target image frames by using a predetermined mapping relationship between the image brightness information and the upper limit value and the lower limit value for the exposure value of the image photographing apparatus. Then, the number of frames for synthesis of the high-dynamic range image is determined based on the determined upper limit value and lower limit value for the exposure value. One exposure value corresponds to one image frame. For example, if the upper limit value and the lower limit value for the exposure value of the image photographing apparatus are determined as +1 and −1, the exposure value of the image photographing apparatus has values of +1, 0, and −1, and the number of frames participating in synthesis of high-dynamic range image is 3. That is, the image photographing apparatus is required to capture 3 image frames in a process of obtaining the high-dynamic range image, and then the high-dynamic range image is synthesized.

In addition, as an example, multiple groups of upper limit values and lower limit values for the exposure value of the image photographing apparatus in the high-dynamic range mode may be determined based on brightness information of each image frame in the at least two consecutive image frames by using a predetermined mapping relationship between the image brightness information and the upper limit value and the lower limit value for the exposure value of the image photographing apparatus. Then, an average value of the upper limit values and an average value of the lower limit values for the exposure value are calculated respectively based on the determined groups of upper limit values and lower limit values for exposure value. Finally, the number of frames for synthesis of the high-dynamic range image is determined based on the average value of the upper limit values and the average value of the lower limit values for the exposure value.

As an example, the preset number of image frames may be selected from the at least two consecutive image frames based on the above image selecting strategy. Currently the preset number of frames may be at least one frame. At least one group of upper limit value and lower limit value of the exposure value of the image photographing apparatus in the high-dynamic range mode may be determined based on brightness information of the preset number of selected image frames. Then, average value of the upper limit values and average value of the lower limit values for the exposure value are calculated respectively based on the determined upper limit values and lower limit values for the exposure values. Finally, the number of frames for synthesis of the high-dynamic range image is determined based on the average value of the upper limit values and average value of the lower limit values for the exposure value. Of course, if only one group of upper limit value and lower limit value for the exposure value is determined, the average values are the upper limit value and the lower limit value for the exposure value themselves.

It should be noted that the image selecting strategy adopted in the process of determining the number of frames for synthesis of the high-dynamic range image may be the same as that adopted in the process of calculating the similarity between images, and images participating in the two operation processes may be the same.

In S205, it is determined that the at least two consecutive image frames do not include two image frames having the similarity less than the preset threshold.

In S206, the photographing mode of the image photographing apparatus is set to a high-dynamic range mode.

In S207, in response to a photographing instruction, the image photographing apparatus is called to capture images in quantity equal to the number of frames for image synthesis, the captured images are synthesized, and the high-dynamic range image is output.

The photographing instruction may be triggered by a user by touching a photographing control on an electronic device. For example, the user triggers the photographing instruction by touching a shutter on the image photographing apparatus. Regarding the way of photographing the high-dynamic range image in the high-dynamic range mode by the image photographing apparatus, reference may be made to the existing high-dynamic range image photographing logic, which is not limited in the embodiment of the present disclosure.

In S208, it is refused to set the photographing mode of the image photographing apparatus to the high-dynamic range mode.

If it is determined that the similarity between the two target image frames is less than the preset threshold, it is determined that the at least two consecutive image frames include two image frames having the similarity less than the preset threshold, and there is a certain difference between the at least two consecutive image frames. Thus, there may be "ghost image" on the high-dynamic range image obtained by image synthesis if photographing images by using the high-dynamic range mode of the image photographing apparatus. Therefore, it is not suitable to set the image photographing apparatus to the high-dynamic range mode.

On the basis of the above technical solution, in an embodiment, setting the number of frames for image synthesis in the process of synthesizing the high-dynamic range image in the high-dynamic range mode based on at least one of the two target image frames may include:

inputting at least one of the two target image frames into an exposure value determination model, and outputting an upper limit value and a lower limit value for exposure value of the image photographing apparatus; where the exposure value determination model is a model that is pre-trained to determine the upper limit value and the lower limit value for the exposure value of the image photographing apparatus; and setting the number of frames for image synthesis in the process of synthesizing the high-dynamic range image in the high-dynamic range mode based on the upper limit value and the lower limit value for the exposure value.

In addition, each of the at least two acquired consecutive image frames or the preset number of image frames selected from the at least two consecutive image frames may be used as input of the exposure value determination model, to output an upper limit value and a lower limit value for the exposure value of the image photographing apparatus.

Further, a process for training the exposure value determination model includes:

acquiring a sample image and labeling of the upper limit value and the lower limit value for the exposure value of the image photographing apparatus corresponding to the sample image; where, for example, a user may capture, for a same photographing object, multiple image frames with different exposure values of the image photographing apparatus in advance, then an image captured in a case that the exposure value is 0 is used as the sample image, and the upper limit value and the lower limit value for the exposure value are determined based on exposure values of the image photographing apparatus in a case of photographing the remaining images and are used as exposure labeling of the sample image; and training the exposure value determination model by taking the sample image as an input and taking the labeling of the upper limit value and the lower limit value for the exposure value of the image photographing apparatus corresponding to the sample image as an output. That is, in the process for training the model, image brightness information may be automatically extracted for the sample image, and a mapping relationship between the image brightness information and the upper limit value and the lower limit value for the exposure value of the image photographing apparatus may be learned.

A model algorithm adopted in model training is not limited in the embodiment of the present disclosure, and may include, for example, but not limited to, a linear classification support vector machine (linearSVC). Moreover, a machine learning model trained based on the linear classification support vector machine has high running efficiency to meet the real-time requirements of the solution, and has high output accuracy to ensure the accuracy of the upper limit value and the lower limit value for exposure value of the image photographing apparatus in the current photographing environment, and further ensure accurate determination of the number of frames for synthesis of the high-dynamic range image.

Further, in the embodiment of the present disclosure, the pre-trained exposure value determination model may be a multi-task model or a single-task model. The multi-task model means that the upper limit value and the lower limit value for the exposure value of the image photographing apparatus may be output simultaneously through one model, which can improve the efficiency in outputting the exposure value. The single-task model means that one model can only output the upper limit value or the lower limit value for the exposure value of the image photographing apparatus, and in this case, the training of the model is simple and easy. In specific applications, the type of model may be determined based on requirements, which is not limited in the embodiment of the present disclosure.

In case of utilizing the single-task models, the exposure value determination model according to the embodiment of the present disclosure may include an exposure upper limit determination model and an exposure lower limit determination model. The exposure upper limit determination model is configured to determine the upper limit value for the exposure value of the image photographing apparatus, and the exposure lower limit determination model is configured to determine the lower limit value for the exposure value of the image photographing apparatus. The principle of training the two models is the same as the process for training the model described above, which is not repeated here.

According to the embodiments of the present disclosure, a photographing mode of an image photographing apparatus is set to a high-dynamic range mode in response to determining that at least two consecutive image frames captured by the image photographing apparatus do not include two image frames having a similarity less than a preset threshold. Thus, an effective detection mechanism is provided to reasonably determine whether to enable the high-dynamic range mode for the image photographing apparatus, which optimizes a detection result, solves the problem that the photographing mode is required to be manually triggered by a user without intelligence in the existing photographing, ensures the accuracy of determining the timing of enabling the high-dynamic range mode, avoids a phenomenon of "ghost image" in subsequent images captured by the user, and ensures an image photographing quality. At the same time, before the image photographing apparatus is set to the high-dynamic range mode (or before the high-dynamic range mode of the image photographing apparatus is used in capturing images), the number of frames participating in synthesis of a high-dynamic range image may be reasonably determined to ensure the rationality of photographing the high-dynamic range image, and the number of frames unnecessary for photographing are reduced, so that the number of frames captured by the image photographing apparatus may be dynamically determined in the process of obtaining the high-dynamic range image, and the photographing intelligence is further improved.

Figure 3:
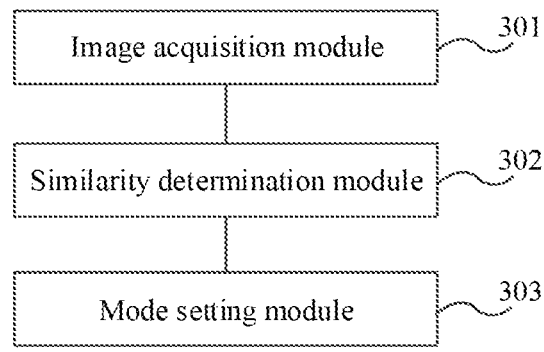
FIG. 3 is a schematic structural diagram of an apparatus for determining a photographing mode according to an embodiment of the present disclosure.

FIG. 3 is a schematic structural diagram of an apparatus for determining a photographing mode according to an embodiment of the present disclosure. The apparatus may be applied to a case of determining for an image photographing apparatus whether to enable a high-dynamic range mode for image photographing. The apparatus according to the embodiment of the present disclosure may be implemented by software and/or hardware, and may be integrated on any electronic device with computing power such as a mobile terminal or a tablet computer integrated with an image photographing apparatus, or an image photographing apparatus specially used for photographing such as a camera device.

As shown in FIG. 3, an apparatus for determining a photographing mode according to an embodiment of the present disclosure includes an image acquisition module 301, a similarity determination module 302 and a mode setting module 303.

The image acquisition module 301 is configured to acquire at least two consecutive image frames captured by an image photographing apparatus.

The similarity determination module 302 is configured to determine whether the at least two consecutive image frames include two image frames having a similarity less than a preset threshold.

The mode setting module 303 is configured to set the photographing mode of the image photographing apparatus to a high-dynamic range mode if the at least two consecutive image frames do not include two image frames having the similarity less than the preset threshold.

In a case that the image photographing apparatus is in the high-dynamic range mode, an image captured and output by the image photographing apparatus is a high-dynamic range image.

Optionally, the similarity determination module 302 includes a target image determination unit, a first similarity determination unit and a second similarity determination unit.

The target image determination unit is configured to determine two target image frames that are separated by a target number of frames from the at least two consecutive image frames.

The first similarity determination unit is configured to determine whether a similarity between the two target image frames is less than the preset threshold.

The second similarity determination unit is configured to determine that the at least two consecutive image frames do not include two image frames having the similarity less than the preset threshold if the similarity between the two target image frames is not less than the preset threshold.

Optionally, the apparatus for determining the photographing mode according to the embodiment of the present disclosure further includes a synthesis frame number determination module.

The synthesis frame number determination module is configured to set the number of frames for image synthesis in a process of synthesizing the high-dynamic range image in the high-dynamic range mode based on at least one of the two target image frames if the similarity between the two target image frames is not less than the preset threshold (i.e., the similarity between the two target image frames is greater than or equal to the preset threshold).

Optionally, the synthesis frame number determination module includes an upper and lower limit determination unit and a synthesis frame number determination unit.

The upper and lower limit determination unit is configured to input at least one of the two target image frames into an exposure value determination model, and output an upper limit value and a lower limit value for an exposure value of the image photographing apparatus.

The synthesis frame number determination unit is configured to set the number of frames for image synthesis in the process of synthesizing the high-dynamic range image in the high-dynamic range mode based on the upper limit value and the lower limit value for the exposure value.

Optionally, the apparatus for determining the photographing mode according to the embodiment of the present disclosure further includes a sample acquisition module and a model training module.

The sample acquisition module is configured to acquire a sample image and labeling of the upper limit value and the lower limit value for the exposure value of the image photographing apparatus corresponding to the sample image.

The model training module is configured to train the exposure value determination model by taking the sample image as an input and taking the labeling of the upper limit value and the lower limit value for the exposure value of the image photographing apparatus corresponding to the sample image as an output.

Optionally, the apparatus for determining the photographing mode according to the embodiment of the present disclosure further includes an image output module.

The image output module is configured to: in response to a photographing instruction, call the image photographing apparatus to capture image frames in quantity equal to the number of frames for image synthesis, synthesize the captured images, and output the high-dynamic range image.

Optionally, the apparatus for determining the photographing mode according to the embodiment of the present disclosure further includes a brightness image determination module.

The brightness image determination module is configured to determine whether the at least two consecutive image frames include an image whose brightness information fulfilling target brightness information; where the target brightness information is used to define an image brightness condition for triggering the high-dynamic range mode.

The mode setting module 303 is specifically configured to:
set the photographing mode of the image photographing apparatus to the high-dynamic range mode if the at least two consecutive image frames include the image whose brightness information fulfilling the target brightness information and the at least two consecutive image frames do not include two image frames having the similarity less than the preset threshold.

The apparatus for determining the photographing mode according to the embodiment of the present disclosure may execute any method for determining the photographing mode according to the embodiment of the present disclosure, and has corresponding functional modules and beneficial effects for performing the method. For the contents not described in detail in the apparatus embodiment of the present disclosure, reference may be made to the description in any method embodiment of the present disclosure.

Figure 4:
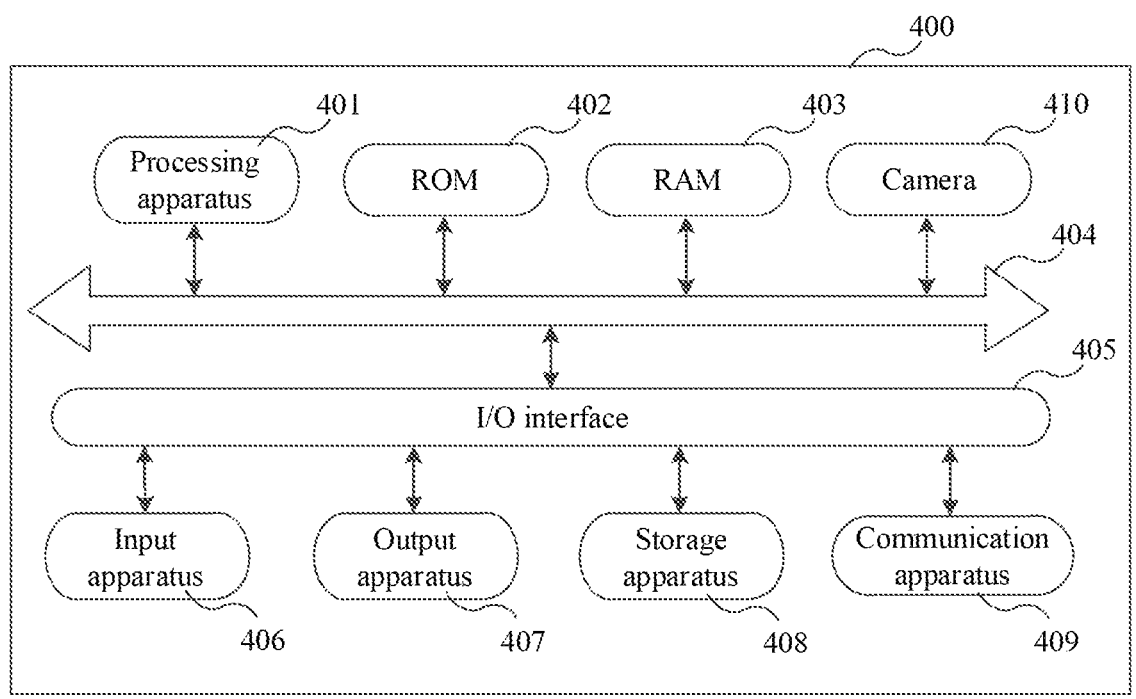
FIG. 4 is a schematic structural diagram of an electronic device according to an embodiment of the present disclosure.

FIG. 4 is a schematic structural diagram of an electronic device according to an embodiment of the present disclosure, which is used for exemplifying the electronic device that executes the method for determining the photographing mode according to the embodiment of the present disclosure. The electronic device according to the embodiments of the present disclosure may include, but is not limited to, mobile phones, laptops, digital broadcast receivers, personal digital assistants (PDAs), tablets (PADs), portable multimedia players (PMPs), vehicle-mounted terminals (such as in-vehicle navigation terminals) and other mobile terminals and fixed terminals such as digital TVs and desktop computers. The electronic device shown in FIG. 4 is only exemplary, and should not indicate any limitation to the function and scope of application of the embodiments of the present disclosure.

As shown in FIG. 4, the electronic device 400 may include a processing apparatus (e.g., a central processing unit or a graphics processor) 401, which may execute various operations and processing based on a program stored in a read only memory (ROM) 402 or a program loaded from a storage apparatus 408 into a random access memory (RAM) 403. The RAM 403 is further configured to store various programs and data required by the electronic device 400 to perform an operation. The processing apparatus 401, the ROM 402 and the RAM 403 are connected to each other through a bus 404. An input/output (I/O) interface 405 is also connected to the bus 404. The electronic device 400 may further include a camera 410 configured to collect multimedia data, such as images or videos. The camera 410 may also be connected with other apparatuses or modules through the bus 404.

Generally, the I/O interface 405 may be connected to: an input apparatus 406, such as a touch screen, a touch panel, a keyboard, a mouse, a microphone, an accelerometer, and a gyroscope, where a camera may also be used as one of the input apparatuses 406 and connected to the I/O interface 405; an output apparatus 407, such as a liquid crystal display (LCD), a speaker, and a vibrator; a storage apparatus 408 such as a magnetic tape and a hard disk; and a communication apparatus 409. The communication apparatus 409 enables wireless or wired communication between the electronic device 400 and other devices for data exchanging. Although FIG. 4 shows an electronic device 400 having various components, it should be understood that the illustrated components are not necessarily required to all be implemented or included. Alternatively, more or fewer components may be implemented or included.

Particularly, according to the embodiments of the present disclosure, the processes described above with reference to the flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 409, or installed from the storage apparatus 408, or installed from the ROM 402. When the computer program is executed by the processing apparatus 401, the functions defined in the method according to the embodiment of the present disclosure are performed.

It is to be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes included in the computer readable medium may be transmitted via any proper medium including but not limited to: a wire, an optical cable, radio frequency (RF) and the like, or any proper combination thereof.

In some embodiments, the client and the server may communicate using any currently known or future developed network protocol such as HyperText Transfer Protocol (HTTP), and may be interconnected with any form or medium of digital data communication (e.g., a communication network). Examples of the communication network include a local area network (LAN), a wide area network (WAN), the internet (e.g., the Internet), and an end-to-end network (e.g., ad hoc end-to-end network) or any of a currently known or a future developed network.

The computer readable medium may be incorporated in the electronic device, or may stand alone without being assembled into the electronic device.

The computer readable medium carries one or more programs. The one or more programs, when executed by the electronic device, cause the electronic device to: acquire at least two consecutive image frames captured by an image photographing apparatus; determine whether the at least two consecutive image frames include two image frames having a similarity less than a preset threshold; and set the photographing mode of the image photographing apparatus to a high-dynamic range mode if the at least two consecutive image frames do not include two image frames having the similarity less than the preset threshold; where in a case that the image photographing apparatus is in the high-dynamic range mode, an image captured and output by the image photographing apparatus is a high-dynamic range image.

The computer program code for performing the operations disclosed in the present disclosure may be written in one or more programming languages or combinations thereof. The programming languages include but are not limited to an object-oriented programming language, such as Java, Smalltalk, and C++, and a conventional procedural programming language, such as C language or a similar programming language. The program code may be executed entirely on a user computer, partially on the user computer, as an standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flowcharts and block diagrams in the drawings illustrate the architecture, functions and operations that may be implemented by the system, method and computer program product according to the embodiments of the present disclosure. In this regard, each block in the flowcharts or the block diagrams may represent a module, a program segment, or a part of code. The module, the program segment, or the part of code contains one or more executable instructions for implementing the specified logical function. It should be also noted that, in some alternative implementations, the functions shown in the blocks may be performed in an order different from the order shown in the drawings. For example, two blocks shown in succession may actually be executed in parallel, or sometimes may be executed in a reverse order, which depends on the functions involved. It should also be noted that, each block in the block diagrams and/or the flowcharts and a combination of blocks in the block diagrams and/or the flowcharts may be implemented by a dedicated hardware-based system performing specified functions or operations, or may be implemented by a combination of dedicated hardware and computer instructions.

The modules or units mentioned in the description of the embodiments of the present disclosure may be implemented by means of software, or otherwise by means of hardware. The name of the module or unit does not constitute a limitation on the module or unit itself under certain circumstances. For example, an image acquisition module may also be described as "a module for acquiring at least two consecutive image frames captured by an image photographing apparatus".

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the present disclosure, a machine readable medium may be a tangible medium, which may contain or store a program used by the instruction execution system, apparatus, or device or a program used in combination with the instruction execution system, apparatus, or device. The machine readable medium may be a machine readable signal medium or a machine readable storage medium. The machine readable medium may include, but is not limited to, a system, an apparatus or a device in an electronic, magnetic, optical, electromagnetic, infrared, or semi-conductive form, or any suitable combination thereof. The machine readable storage medium, for example, includes an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof.

It should be noted that in the present disclosure, in combination with specific contexts, relational terms such as "first" and "second" may be used to distinguish one entity or operation from another entity or operation, but do not indicate or imply an actual relationship or order of these entities or operations. In addition, terms of "include", "comprise" or any other variants are intended to be non-exclusive. Therefore, a process, method, article or device including multiple elements includes not only the elements but also other elements that are not enumerated, or also includes the elements inherent for the process, method, article or device. Unless expressively limited otherwise, an element defined by a statement of "including one . . . " does not exclude a case that other similar elements exist in the process, method, article or device including the element.

The above are only specific implementations of the present disclosure, so that those skilled in the art can understand or implement the present disclosure. Numerous modifications to the embodiments are apparent to those skilled in the art, and the general principles defined herein may be implemented in other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A method for determining a photographing mode, comprising:
   acquiring at least two consecutive image frames captured by an image photographing apparatus;
   determining whether the at least two consecutive image frames include two image frames having a similarity less than a preset threshold; and
   switching the photographing mode of the image photographing apparatus from a non-high-dynamic range mode to a high-dynamic range mode if the at least two consecutive image frames do not include two image frames having the similarity less than the preset threshold;
   wherein in a case that the image photographing apparatus is in the high-dynamic range mode, an image captured and output by the image photographing apparatus is a high-dynamic range image.

2. The method according to claim 1, wherein the determining whether the at least two consecutive image frames include two image frames having the similarity less than the preset threshold comprises:
   determining two target image frames that are separated by a target number of frames from the at least two consecutive image frames;
   determining whether a similarity between the two target image frames is less than the preset threshold; and
   determining that the at least two consecutive image frames do not include two image frames having the similarity less than the preset threshold if the similarity between the two target image frames is not less than the preset threshold.

3. The method according to claim 2, wherein after determining whether the similarity between the two target image frames is less than the preset threshold, the method further comprises:

setting, based on at least one of the two target image frames, a number of frames for image synthesis in a process of synthesizing the high-dynamic range image in the high-dynamic range mode if the similarity between the two target image frames is not less than the preset threshold.

4. The method according to claim 3, wherein the setting, based on at least one of the two target image frames, the number of frames for image synthesis in the process of synthesizing the high-dynamic range image in the high-dynamic range mode comprises:

inputting at least one of the two target image frames into an exposure value determination model, and outputting an upper limit value and a lower limit value for an exposure value of the image photographing apparatus; and setting, based on the upper limit value and the lower limit value for the exposure value, the number of frames for image synthesis in the process of synthesizing the high-dynamic range image in the high-dynamic range mode.

5. The method according to claim 4, wherein a process for training the exposure value determination model comprises:

acquiring a sample image and labeling of the upper limit value and the lower limit value for the exposure value of the image photographing apparatus corresponding to the sample image; and training the exposure value determination model by taking the sample image as an input and taking the labeling of the upper limit value and the lower limit value for the exposure value of the image photographing apparatus corresponding to the sample image as an output.

6. The method according to claim 3, wherein after switching the photographing mode of the image photographing apparatus from the non-high-dynamic range mode to the high-dynamic range mode, the method further comprises:

in response to a photographing instruction, calling the image photographing apparatus to capture image frames in quantity equal to the number of frames for image synthesis, synthesizing the captured images, and outputting the high-dynamic range image.

7. The method according to claim 1, wherein before switching the photographing mode of the image photographing apparatus from the non-high-dynamic range mode to the high-dynamic range mode, the method further comprises:

determining whether the at least two consecutive image frames include an image whose brightness information fulfilling target brightness information; wherein the target brightness information is used to define an image brightness condition for triggering the high-dynamic range mode; and the switching the photographing mode of the image photographing apparatus from the non-high-dynamic range mode to the high-dynamic range mode if the at least two consecutive image frames do not include two image frames having the similarity less than the preset threshold comprises:

switching the photographing mode of the image photographing apparatus to the high-dynamic range mode if the at least two consecutive image frames include the image whose brightness information fulfilling the target brightness information and the at least two consecutive image frames do not include two image frames having the similarity less than the preset threshold.

8. An electronic device, comprising:
a processor;
a memory configured to store processor-executable instructions, and
a camera for capture images;
wherein the processor is configured to read the executable instructions from the memory and execute the executable instructions to implement:
acquiring at least two consecutive image frames captured by an image photographing apparatus;
determining whether the at least two consecutive image frames include two image frames having a similarity less than a preset threshold; and
switching the photographing mode of the image photographing apparatus from a non-high-dynamic range mode to a high-dynamic range mode if the at least two consecutive image frames do not include two image frames having the similarity less than the preset threshold;
wherein in a case that the image photographing apparatus is in the high-dynamic range mode, an image captured and output by the image photographing apparatus is a high-dynamic range image.

9. The electronic device according to claim 8, wherein the processor is further configured for:

determining two target image frames that are separated by a target number of frames from the at least two consecutive image frames;

determining whether a similarity between the two target image frames is less than the preset threshold; and determining that the at least two consecutive image frames do not include two image frames having the similarity less than the preset threshold if the similarity between the two target image frames is not less than the preset threshold.

10. The electronic device according to claim 9, wherein the processor is further configured for:

setting, based on at least one of the two target image frames, a number of frames for image synthesis in a process of synthesizing the high-dynamic range image in the high-dynamic range mode if the similarity between the two target image frames is not less than the preset threshold.

11. The electronic device according to claim 10, wherein the processor is further configured for:

inputting at least one of the two target image frames into an exposure value determination model, and outputting an upper limit value and a lower limit value for an exposure value of the image photographing apparatus; and setting, based on the upper limit value and the lower limit value for the exposure value, the number of frames for image synthesis in the process of synthesizing the high-dynamic range image in the high-dynamic range mode.

12. The electronic device according to claim 11, wherein the processor is further configured for:

acquiring a sample image and labeling of the upper limit value and the lower limit value for the exposure value of the image photographing apparatus corresponding to the sample image; and training the exposure value determination model by taking the sample image as an input and taking the labeling of the upper limit value and the lower limit value for the exposure value of the image photographing apparatus corresponding to the sample image as an output.

13. The electronic device according to claim 10, wherein the processor is further configured for:
in response to a photographing instruction, calling the image photographing apparatus to capture image frames in quantity equal to the number of frames for image synthesis, synthesizing the captured images, and outputting the high-dynamic range image.

14. The electronic device according to claim 8, wherein the processor is further configured for:
determining whether the at least two consecutive image frames include an image whose brightness information fulfilling target brightness information; wherein the target brightness information is used to define an image brightness condition for triggering the high-dynamic range mode; and
switching the photographing mode of the image photographing apparatus from the non-high-dynamic range mode to the high-dynamic range mode if the at least two consecutive image frames include the image whose brightness information fulfilling the target brightness information and the at least two consecutive image frames do not include two image frames having the similarity less than the preset threshold.

15. A non-transitory computer readable storage medium storing a computer program, wherein the computer program, when executed by a processor, causes the processor to implement:
acquiring at least two consecutive image frames captured by an image photographing apparatus;
determining whether the at least two consecutive image frames include two image frames having a similarity less than a preset threshold; and
switching the photographing mode of the image photographing apparatus from a non-high-dynamic range mode to a high-dynamic range mode if the at least two consecutive image frames do not include two image frames having the similarity less than the preset threshold;
wherein in a case that the image photographing apparatus is in the high-dynamic range mode, an image captured and output by the image photographing apparatus is a high-dynamic range image.

16. The non-transitory computer readable storage medium according to claim 15, wherein the computer program further cause the processor to implement:
determining two target image frames that are separated by a target number of frames from the at least two consecutive image frames;
determining whether a similarity between the two target image frames is less than the preset threshold; and
determining that the at least two consecutive image frames do not include two image frames having the similarity less than the preset threshold if the similarity between the two target image frames is not less than the preset threshold.

17. The non-transitory computer readable storage medium according to claim 16, wherein the computer program further cause the processor to implement:
setting, based on at least one of the two target image frames, a number of frames for image synthesis in a process of synthesizing the high-dynamic range image in the high-dynamic range mode if the similarity between the two target image frames is not less than the preset threshold.

18. The non-transitory computer readable storage medium according to claim 17, wherein the computer program further cause the processor to implement:
inputting at least one of the two target image frames into an exposure value determination model, and outputting an upper limit value and a lower limit value for an exposure value of the image photographing apparatus; and
setting, based on the upper limit value and the lower limit value for the exposure value, the number of frames for image synthesis in the process of synthesizing the high-dynamic range image in the high-dynamic range mode.

19. The non-transitory computer readable storage medium according to claim 18, wherein the computer program further cause the processor to implement:
acquiring a sample image and labeling of the upper limit value and the lower limit value for the exposure value of the image photographing apparatus corresponding to the sample image; and
training the exposure value determination model by taking the sample image as an input and taking the labeling of the upper limit value and the lower limit value for the exposure value of the image photographing apparatus corresponding to the sample image as an output.

20. The non-transitory computer readable storage medium according to claim 18, wherein the computer program further cause the processor to implement:
in response to a photographing instruction, calling the image photographing apparatus to capture image frames in quantity equal to the number of frames for image synthesis, synthesizing the captured images, and outputting the high-dynamic range image.

* * * * *